(12) United States Patent
Shinzawa et al.

(10) Patent No.: US 11,331,955 B2
(45) Date of Patent: May 17, 2022

(54) PNEUMATIC TIRE

(71) Applicant: The Yokohama Rubber Co., LTD., Tokyo (JP)

(72) Inventors: Tatsuro Shinzawa, Hiratsuka (JP); Takayuki Shiraishi, Hiratsuka (JP); Hiraku Kouda, Hiratsuka (JP); Takanori Uemura, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 199 days.

(21) Appl. No.: 16/331,084

(22) PCT Filed: Sep. 4, 2017

(86) PCT No.: PCT/JP2017/031779
§ 371 (c)(1),
(2) Date: Mar. 6, 2019

(87) PCT Pub. No.: WO2018/047764
PCT Pub. Date: Mar. 15, 2018

(65) Prior Publication Data
US 2019/0193473 A1 Jun. 27, 2019

(30) Foreign Application Priority Data
Sep. 8, 2016 (JP) .............................. JP2016-175759

(51) Int. Cl.
*B60C 11/12* (2006.01)
*B60C 5/00* (2006.01)
*B60C 11/03* (2006.01)

(52) U.S. Cl.
CPC ............ *B60C 11/1218* (2013.01); *B60C 5/00* (2013.01); *B60C 11/03* (2013.01); *B60C 11/12* (2013.01);
(Continued)

(58) Field of Classification Search
CPC ............. B60C 2011/1213; B60C 11/12; B60C 11/1204; B60C 11/1281
See application file for complete search history.

(56) References Cited

U.S. PATENT DOCUMENTS

| | | | |
|---|---|---|---|
| 2011/0120610 A1* | 5/2011 | Fugier | B60C 11/1218 152/209.21 |
| 2013/0206298 A1 | 8/2013 | Guillermou et al. | |

(Continued)

FOREIGN PATENT DOCUMENTS

| | | | | |
|---|---|---|---|---|
| JP | 2003-205710 | | 7/2003 | |
| JP | 2007223493 A | * | 9/2007 | ......... B60C 11/1281 |

(Continued)

OTHER PUBLICATIONS

International Search Report for International Application No. PCT/JP2017/031779 dated Oct. 31, 2017, 4 pages, Japan.

*Primary Examiner* — Cedrick S Williams
(74) *Attorney, Agent, or Firm* — Thorpe North & Western

(57) ABSTRACT

Provided is a pneumatic tire. A sipe includes, on each of a leading side edge and a trailing side edge, a chamfered portion and a non-chamfered region in which no other chamfered portion is present. A maximum depth of the chamfered portion is shallower than a maximum depth of the sipe, and a width of the sipe is substantially constant. In a cross-sectional view perpendicular to a lengthwise direction of the sipe, at least one chamfered portion has a profile line that projects outwards in the radial direction beyond a chamfer reference line connecting the end portions of the chamfered portion, and a cross-sectional area of a chamfered region that is surrounded by the profile line, the sipe, and a tread contact surface of a tread portion is smaller than a cross-sectional area of a reference region surrounded by the chamfer reference line, the sipe, and the tread contact surface.

15 Claims, 10 Drawing Sheets

(52) U.S. Cl.
CPC ... *B60C 11/1281* (2013.01); *B60C 2011/1209* (2013.01); *B60C 2011/1227* (2013.01)

(56) References Cited

U.S. PATENT DOCUMENTS

| | | | |
|---|---|---|---|
| 2013/0248068 A1* | 9/2013 | Nakata | B60C 11/1392 152/209.18 |
| 2018/0015788 A1 | 1/2018 | Hayashi | |
| 2019/0001753 A1* | 1/2019 | Hayashi | B60C 11/04 |

FOREIGN PATENT DOCUMENTS

| | | |
|---|---|---|
| JP | 2008-247336 | 10/2008 |
| JP | 2013-035345 | 2/2013 |
| JP | 2013-537134 | 9/2013 |
| WO | WO 2012/032144 | 3/2012 |
| WO | WO 2016/125814 | 8/2016 |
| WO | WO 2017/141651 | 8/2017 |

* cited by examiner

PNEUMATIC TIRE

TECHNICAL FIELD

The present technology relates to a pneumatic tire, and more particularly, to a pneumatic tire capable of improving steering stability performance on dry road surfaces and improving steering stability performance on wet road surfaces in a compatible manner by devising a chamfered shape of a sipe.

BACKGROUND ART

Conventionally, in a tread pattern of a pneumatic tire, a plurality of sipes are formed on ribs defined by a plurality of main grooves. Such sipes are provided such that drainage properties are ensured and steering stability performance on wet road surfaces is achieved. However, when a large number of sipes are disposed in the tread portion for improving the steering stability performance on wet road surfaces, the rigidity of the rib is reduced, so there is a disadvantage that steering stability performance on dry road surfaces is deteriorated.

Various proposals have been made on pneumatic tires in which sipes are formed in a tread pattern and chamfered (see, for example, Japan Unexamined Patent Publication No. 2013-537134). When forming a sipe and chamfering it, the edge effect may be lost depending on the shape of chamfer, and improvement in steering stability performance on dry road surfaces or steering stability performance on wet road surfaces may be insufficient depending on the chamfering size.

SUMMARY

The present technology provides a pneumatic tire capable of achieving improvement in steering stability performance on dry road surfaces and improvement in steering stability performance on wet road surfaces in a compatible manner by devising a chamfer shape of a sipe.

A pneumatic tire of the present technology includes a plurality of main grooves extending in a tire circumferential direction in a tread portion; and a sipe extending in a tire width direction in a rib defined by the plurality of main grooves, the sipe including a leading side edge and a trailing side edge, a chamfered portion shorter than a sipe length of the sipe being formed in each of the leading side edge and the trailing side edge, a non-chamfered region including no other chamfered portion being present at a part facing each chamfered portion of the sipe, a maximum depth y (mm) of the chamfered portion being shallower than a maximum depth x (mm) of the sipe, a sipe width of the sipe being constant in a range from an end positioned inward of the chamfered portion in a tire radial direction to a groove bottom of the sipe, at least one of the chamfered portions when viewed as a cross-section perpendicular to a longitudinal direction of the sipe including a profile line that projects outwards in a tire radial direction beyond a chamfer reference line connecting both ends of the chamfered portion, and a cross-sectional area a of a chamfered region surrounded by the profile line, the sipe, and a tread contact surface of the tread portion being smaller than a cross-sectional area b of a reference region surrounded by the chamfer reference line, the sipe, and the tread contact surface.

According to the present technology, in a pneumatic tire including a sipe extending in the tire width direction on a rib defined by a main groove, while a chamfered portion shorter than the sipe length of the sipe is formed in each of the leading side edge and the trailing side edge of the sipe, there is a non-chamfered region including no other chamfered portion in the part facing each chamfered portion in the sipe, thereby improving the drainage effect based on the chamfered portion and at the same time the non-chamfered region is capable of effectively removing the water film by the edge effect. This thereby enables steering stability performance on wet road surfaces to be significantly improved. Moreover, since the chamfered portion and the non-chamfered region are mixed in each of the leading side edge and the trailing side edge, the beneficial effect of improving the wet performance as described above may be maximized at the time of braking and at the time of accelerating. Further, compared to the sipe chamfered in a conventional manner, since the area to be chamfered can be minimized, improvement in steering stability performance on dry road surfaces is enabled. As a result, improvement in steering stability performance on dry road surfaces and improvement in steering stability performance on wet road surfaces can be achieved in a compatible manner. Furthermore, since at least one of the chamfered portions when viewed as a cross-section perpendicular to a longitudinal direction of the sipe has a profile line that projects outwards in a tire radial direction beyond a chamfer reference line connecting both ends of the chamfered portion, and since a cross-sectional area a of a chamfered region surrounded by the profile line, the sipe, and a tread contact surface of the tread portion is smaller than a cross-sectional area b of a reference region surrounded by the chamfer reference line, the sipe, and the tread contact surface, the block rigidity may be improved without reducing the ratio of the groove area on the tread pattern, thereby enabling the steering stability performance on dry road surfaces to be improved while maintaining the steering stability performance on wet road surfaces.

In the present technology, the cross-sectional area a of the chamfered region is preferably in the range of from 30% to 95% of the cross-sectional area b of the reference region. More preferably, it is from 50% to 85%. This enables the steering stability performance on dry road surfaces to be improved while maintaining the steering stability performance on wet road surfaces.

In the present technology, the volume Va of the chamfered region is preferably in the range of from 30% to 95% of the volume Vb of the reference region. More preferably, it is from 50% to 85%. This enables the steering stability performance on dry road surfaces to be improved while maintaining the steering stability performance on wet road surfaces.

In the present technology, it is preferable that, when a position at which the chamfer reference line and the profile line of the chamfered portion are most distant from each other is set as an offset position, an offset distance A which is a distance from a width direction end of the sipe on a tire surface to the offset position is in a range of from 30% to 95% of a reference distance B which is on the same straight line as the offset distance A and which is a distance from a width direction end of the sipe on a tire surface to the chamfer reference line. More preferably, it is from 60% to 90%. This enables the steering stability performance on dry road surfaces to be improved while maintaining the steering stability performance on wet road surfaces.

In the present technology, it is preferable that the maximum depth x (mm) of the sipe and the maximum depth y (mm) of the chamfered portion satisfy the relationship of the following formula (1). This enables the steering stability performance on dry road surfaces and the steering stability performance on wet road surfaces to be improved effectively.

$$xx0.1 \leq y \leq xx0.3+1.0 \quad (1)$$

In the present technology, it is preferable that, when a distance from a width direction end of the sipe on a tire surface to an offset position, which is a position at which the chamfer reference line and the profile line of the chamfered portion are most distant from each other, is set as an offset distance A, at least one side of the chamfered portions is opened to the main groove, and in the chamfered portion opened to the main groove, the offset distance A at the rib center side end is smaller than the offset distance A at the main groove side end. Since the drainage property is not hindered, this enables the steering stability performance on dry road surfaces to be improved without deteriorating the steering stability performance on wet road surfaces.

In the present technology, it is preferable that in the chamfered portion opened to the main groove, the offset distance A at the rib center side end be from 0.5 to 0.9 times the offset distance A at the main groove side end. More preferably, it is from 0.6 to 0.8 times. Since the drainage property is not hindered, this enables the steering stability performance on dry road surfaces to be improved without deteriorating the steering stability performance on wet road surfaces.

In the present technology, it is preferable that, at least one side of the chamfered portions is opened to the main groove, and in the chamfered portion opened to the main groove, a cross-sectional area a of the chamfered region at the rib center side end is smaller than a cross-sectional area a of the chamfered region at the main groove side end. Since the drainage property is not hindered, this enables the steering stability performance on dry road surfaces to be improved without deteriorating the steering stability performance on wet road surfaces.

In the present technology, it is preferable that, in the chamfered portion opened to the main groove, the cross-sectional area a of the chamfered region at the rib center side end is from 0.5 to 0.9 times the cross-sectional area a of the chamfered region at the main groove side end. More preferably, it is from 0.6 to 0.8 times. Since the drainage property is not hindered, this enables the steering stability performance on dry road surfaces to be improved without deteriorating the steering stability performance on wet road surfaces.

In the present technology, it is preferable that, the pneumatic tire has a designated mounting direction with respect to a vehicle and a tread pattern asymmetric with respect to two sides of a tire center line, and when a distance from a width direction end of the sipe on a tire surface to an offset position, which is a position at which the chamfer reference line and the profile line of the chamfered portion are most distant from each other, is set as an offset distance A, in the rib, the offset distance A of the chamfered portion located on the vehicle outer side is smaller than the offset distance A of the chamfered portion located on the vehicle inner side. This enables the steering stability performance on dry road surfaces to be improved while maintaining the steering stability performance on wet road surfaces.

In the present technology, it is preferable that the offset distance A of the chamfered portion located on the vehicle outer side be from 0.5 to 0.9 times the offset distance A of the chamfered portion located on the vehicle inner side. More preferably, it is from 0.6 to 0.8 times. This enables the steering stability performance on dry road surfaces to be improved while maintaining the steering stability performance on wet road surfaces.

In the present technology, it is preferable that, the pneumatic tire has a designated mounting direction with respect to a vehicle and a tread pattern asymmetric with respect to two sides of a tire center line, and in the rib, a cross-sectional area a of the chamfered region at the chamfered portion located on the vehicle outer side is smaller than a cross-sectional area a of the chamfered region at the chamfered portion located on the vehicle inner side. This enables the steering stability performance on dry road surfaces to be improved while maintaining the steering stability performance on wet road surfaces.

In the present technology, it is preferable that the cross-sectional area a of the chamfered region at the chamfered portion located on the vehicle outer side be from 0.5 to 0.9 times the cross-sectional area a of the chamfered region at the chamfered portion located on the vehicle inner side. More preferably, it is from 0.6 to 0.8 times. This enables the steering stability performance on dry road surfaces to be improved while maintaining the steering stability performance on wet road surfaces.

In the present technology, it is preferable that, the pneumatic tire has a designated mounting direction with respect to a vehicle and a tread pattern asymmetric with respect to two sides of a tire center line, and in the rib, a volume Va of the chamfered region at the chamfered portion located on the vehicle outer side is smaller than a volume Va of the chamfered region at the chamfered portion located on the vehicle inner side. This enables the steering stability performance on dry road surfaces to be improved while maintaining the steering stability performance on wet road surfaces.

In the present technology, it is preferable that the volume Va of the chamfered region at the chamfered portion located on the vehicle outer side be from 0.5 to 0.9 times a volume Va of the chamfered region at the chamfered portion located on the vehicle inner side. More preferably, it is from 0.6 to 0.8 times. This enables the steering stability performance on dry road surfaces to be improved while maintaining the steering stability performance on wet road surfaces.

BRIEF DESCRIPTION OF DRAWINGS

FIG. 5A is a cross-sectional view taken along a line X-X, FIG. 5B is an enlarged cross-sectional view of the chamfered portion of the sipe of FIG. 5A, FIG. 5C illustrates the cross-sectional area a of a chamfered region Ra, and FIG. 5D illustrates the cross-sectional area b of a reference region Rb.

FIGS. 8A and 8B are plan views of the respective modifications.

DETAILED DESCRIPTION

Figure 1:
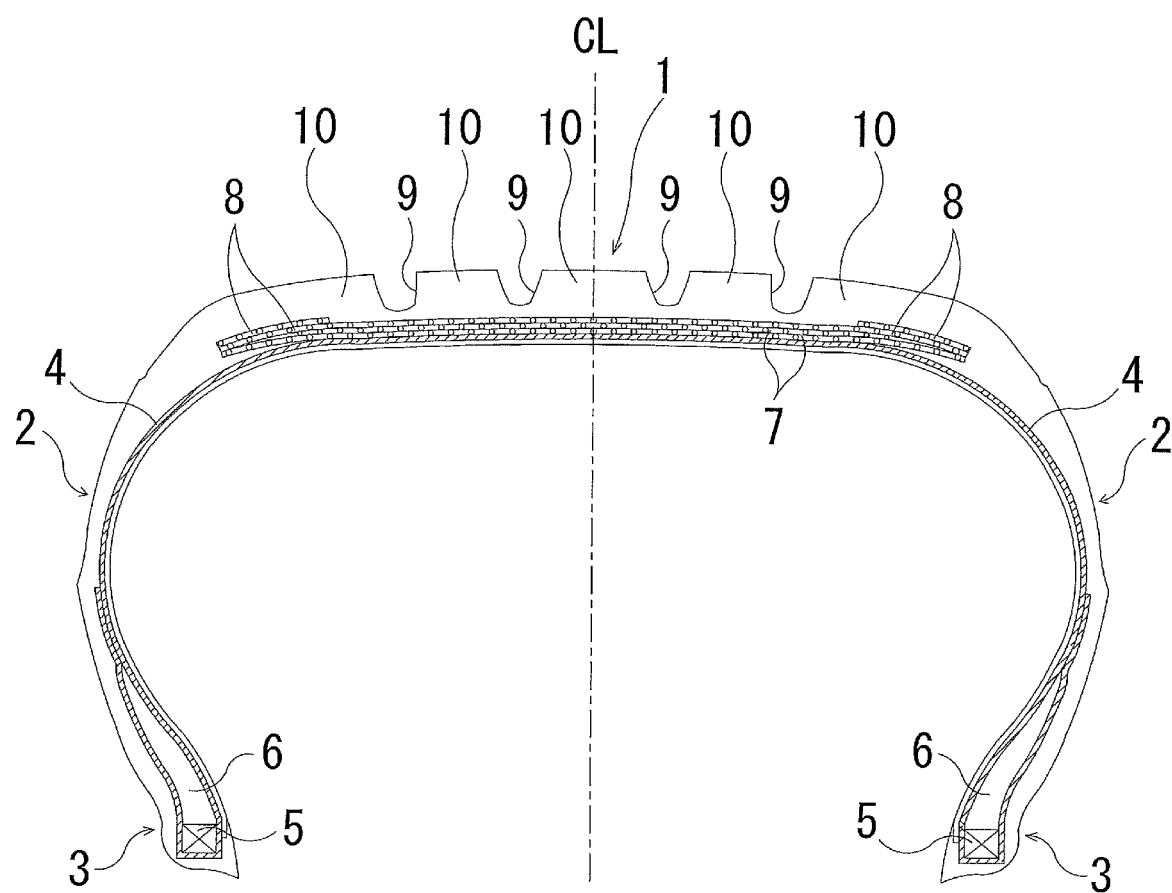
FIG. 1 is a meridian cross-sectional view illustrating a pneumatic tire according to an embodiment of the present technology.

Configuration of embodiments of the present technology are described in detail below with reference to the accompanying drawings. In FIG. 1, CL is the tire equatorial plane.

As illustrated in FIG. 1, a pneumatic tire according to embodiments of the present technology includes an annular tread portion 1 extending in the tire circumferential direction, a pair of sidewall portions 2, 2 disposed on both sides of the tread portion 1, and a pair of bead portions 3, 3 disposed inward of the sidewall portions 2 in the tire radial direction.

A carcass layer 4 is mounted between the pair of bead portions 3, 3. The carcass layer 4 includes a plurality of reinforcing cords extending in the tire radial direction and is folded back around bead cores 5 disposed in each of the bead portions 3 from a tire inner side to a tire outer side. A bead filler 6 having a triangular cross-sectional shape formed from rubber composition is disposed on the outer circumference of the bead core 5.

A plurality of belt layers 7 are embedded on an outer circumferential side of the carcass layer 4 in the tread portion 1. The belt layers 7 include a plurality of reinforcing cords that are inclined with respect to the tire circumferential direction with the reinforcing cords of the different layers arranged in a criss-cross manner. In the belt layers 7, an inclination angle of the reinforcing cords with respect to the tire circumferential direction ranges from, for example, 10° to 40°. Steel cords are preferably used as the reinforcing cords of the belt layers 7. To improve high-speed durability, at least one belt cover layer 8 formed by arranging reinforcing cords at an angle of, for example, not greater than 5° with respect to the tire circumferential direction, is disposed on an outer circumferential side of the belt layers 7. Nylon, aramid, or similar organic fiber cords are preferably used as the reinforcing cords of the belt cover layer 8.

Also, a plurality of main grooves 9 extending in the tire circumferential direction is formed in the tread portion 1. These main grooves 9 define the tread portion 1 into a plurality of rows of ribs 10.

Note that the tire internal structure described above represents a typical example for a pneumatic tire, and the pneumatic tire is not limited thereto.

Figure 2:
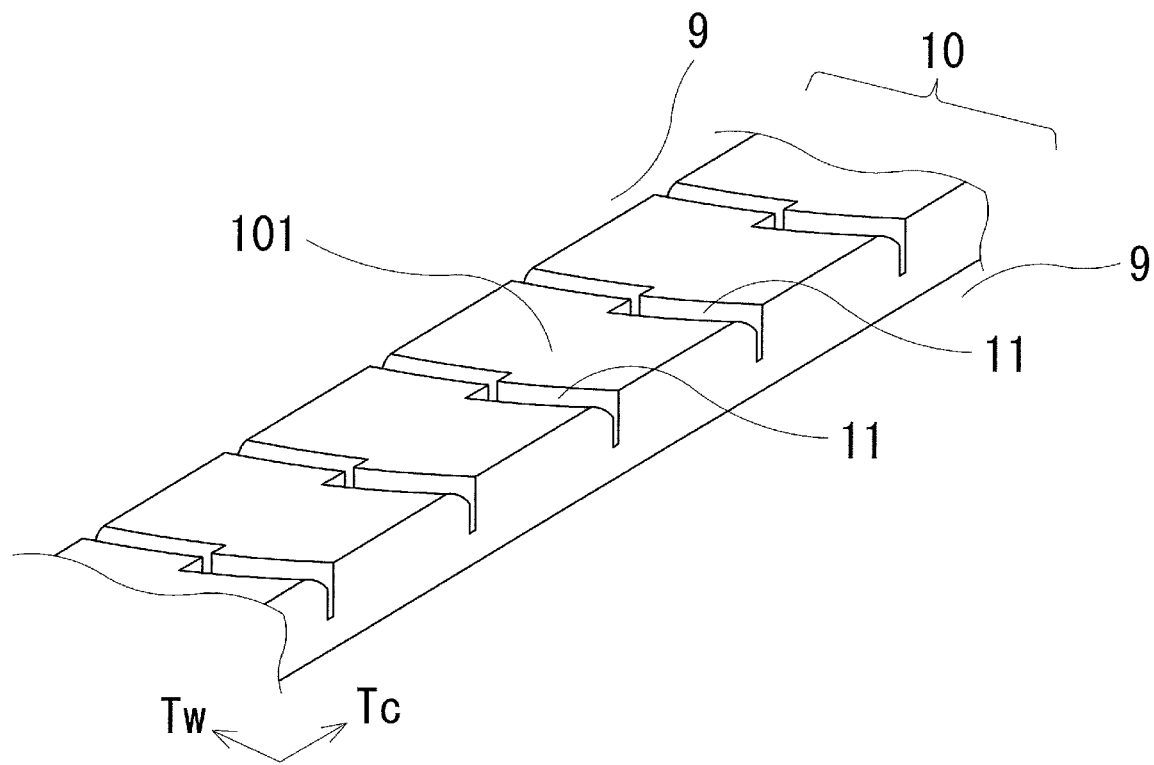
FIG. 2 is a perspective view illustrating part of a tread portion of a pneumatic tire according to the present technology.
Figure 3:
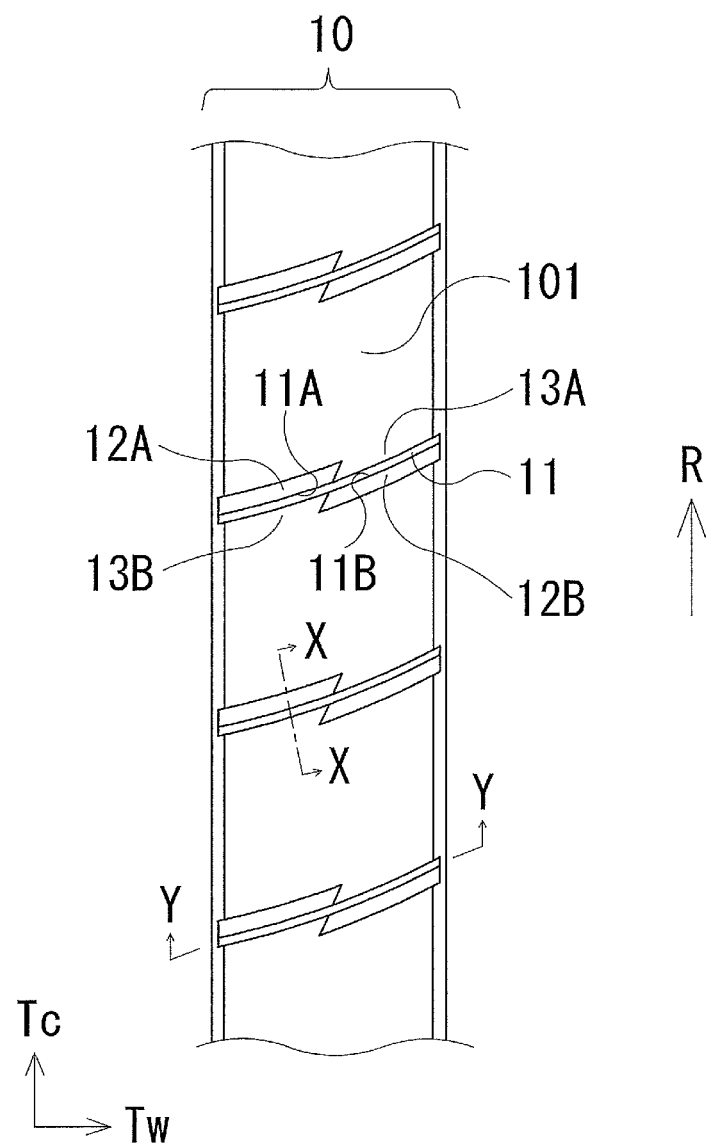
FIG. 3 is a plan view illustrating part of a tread portion of a pneumatic tire according to the present technology.
Figure 4:
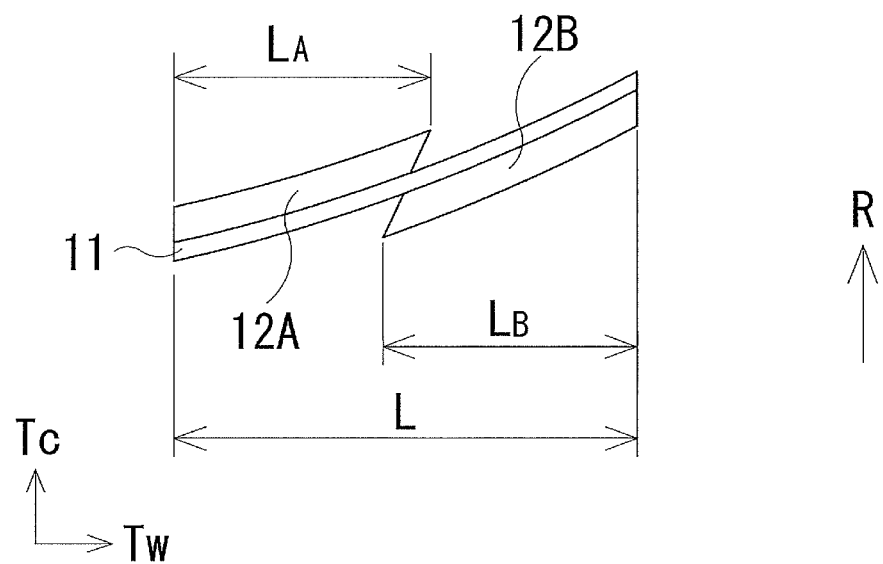
FIG. 4 is a plan view illustrating a sipe and a chamfered portion thereof formed in the tread portion of FIG. 3.

FIGS. 2 to 4 illustrate a part of the tread portion 1, Tc indicates the tire circumferential direction, and Tw indicates the tire width direction. As illustrated in FIG. 2, the rib 10 includes a plurality of sipes 11 extending in the tire width direction, and a block 101 defined by the sipes 11. The plurality of blocks 101 are arranged to line up in the tire circumferential direction. In addition, the sipe 11 is an open sipe penetrating the rib 10 in the tire width direction, and both ends of the sipe 11 communicate with the main grooves 9 located on both sides of the rib 10. Furthermore, the sipe 11 may be a closed sipe whose opposite ends terminate in the rib 10, or may be a semi-closed sipe in which only one end of the sipe 11 terminates in the rib 10. The sipe 11 is a narrow groove having a groove width of 1.5 mm or less.

As illustrated in FIG. 3, the sipe 11 has a curved shape as a whole, and is formed in the rib 10 at intervals in the circumferential direction. Further, the sipe 11 includes an edge 11A which is on the leading side with respect to the rotation direction R, and an edge 11B which is on the trailing side with respect to the rotation direction R. A chamfered portion 12 is formed on each of the edge 11A on the leading side and the edge 11B on the trailing side.

The chamfered portion 12 includes a chamfered portion 12A which is on the leading side with respect to the rotation direction R and a chamfered portion 12B which is on the trailing side with respect to the rotation direction R. There is a non-chamfered region 13 including no other chamfered portion in the part facing the chamfered portion 12. Namely, there is a non-chamfered region 13B which is on the trailing side with respect to the rotational direction R at a part facing the chamfered portion 12A and a non-chamfered region 13A which is on the leading side with respect to the rotational direction R at a part facing the chamfered portion 12B. In this manner, the chamfered portion 12 and the non-chamfered region 13 including no other chamfered portion are disposed adjacent to each other on each of the edge 11A on the leading side and the edge 11B on the trailing side of the sipe 11.

As illustrated in FIG. 4, in the sipe 11 and the chamfered portions 12A and 12B, the length in the tire width direction is set as the sipe length L, the chamfered lengths $L_A$ and $L_B$, respectively. These sipe length L and the chamfered lengths $L_A$ and $L_B$ are the length in the tire width direction from one end to the other end of each of the sipes 11 or the chamfered portions 12A and 12B. The chamfered lengths $L_A$ and $L_B$ of the chamfered portions 12A and 12B are both formed to be shorter than the sipe length L of the sipe 11.

Figure 5A:
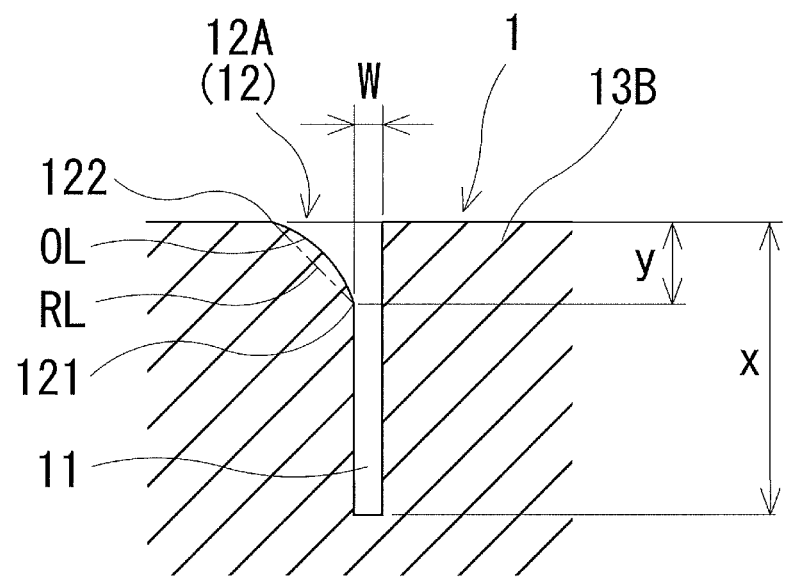
FIGS. 5A-5D illustrate a sipe and a chamfered portion thereof formed in the tread portion of the pneumatic tire of FIG. 3.

FIG. 5A is a cross-sectional view perpendicular to the sipe 11, in which the tread portion 1 is cut out in the vertical direction. As illustrated in FIG. 5A, when the maximum depth of the sipe 11 is set as x (mm) and the maximum depth of the chamfered portion 12 is set as y (mm), the sipe 11 and the chamfered portion 12 are formed such that the maximum depth y (mm) becomes shallow than the maximum depth x (mm). The maximum depth x of the sipe 11 is preferably from 3 mm to 8 mm. The sipe width W of the sipe 11 is substantially constant in a range from the end 121 located on the inner side in the tire radial direction of the chamfered portion 12 to the groove bottom of the sipe 11. The sipe width W is determined such that the width is the substantially measured width of the sipe 11, for example, in a case that a ridge exists on the groove wall of the sipe 11, by not including the height of the ridge in the sipe width; or in a case that the sipe width of the sipe 11 gradually narrows toward the groove bottom, by not including the narrowed portion in the sipe width.

Figure 5B:
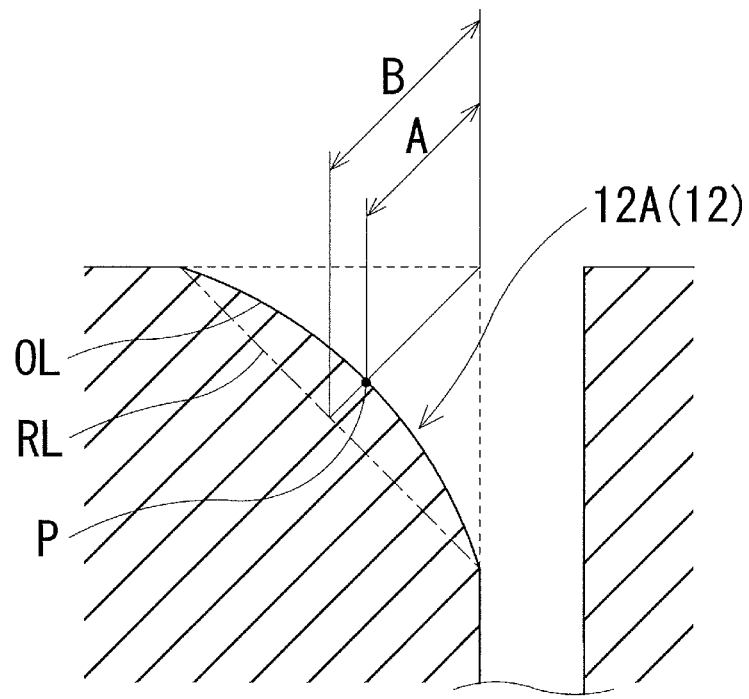
Figure 5C:
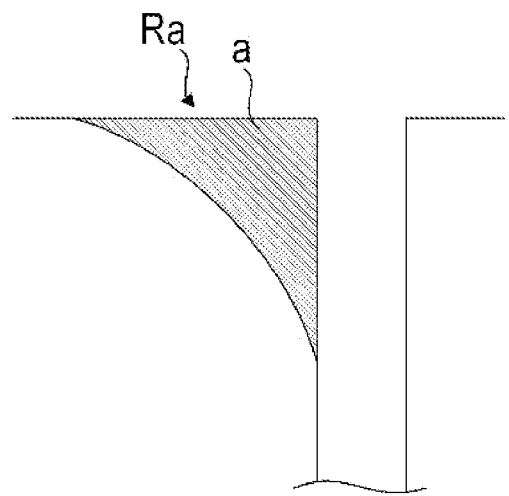
Figure 5D:
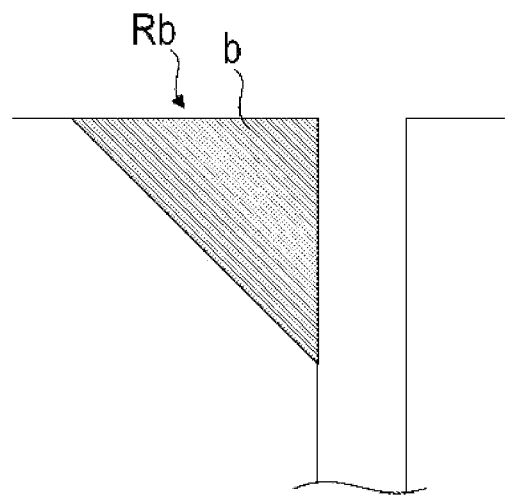

FIG. 5B is an enlarged view of the chamfered portion 12 illustrated in FIG. 5A. As illustrated in FIG. 5B, in a cross-sectional view perpendicular to the longitudinal direction of the sipe 11, a line segment connecting the ends 121 and 122 of the chamfered portion 12 is defined as a chamfer reference line RL. At least one of the chamfered portions 12A and 12B has a profile line OL that projects outwards in the tire radial direction beyond the chamfer reference line RL. The region surrounded by the profile line OL, the sipe 11 and the tread contact surface of the tread portion 1 is defined as a chamfered region Ra; and the region surrounded by the chamfer reference line RL, the sipe 11, and the tread contact surface is set as a reference region Rb. Namely, the region surrounded by the two dotted lines and the profile line OL illustrated in FIG. 5B is the chamfered region Ra (see FIG. 5C), and the triangular region surrounded by the two dotted lines and the chamfer reference line RL illustrated in FIG. 5B is the reference region Rb (see FIG. 5D). At this time, the cross-sectional area a of the chamfered region Ra (see FIG. 5C) is smaller than the cross-sectional area b of the reference region Rb (see FIG. 5D).

Note that, in the chamfered portions 12A and 12B, in the embodiment of FIGS. 5A and 5B, an example is illustrated in which the entire profile line OL has a shape that projects outwards in the tire radial direction beyond the chamfer reference line RL, however, a shape may be locally provided in which a part of the profile line OL has a shape that projects outwards in the tire radial direction beyond the chamfer reference line RL.

In the above-described pneumatic tire, by providing a chamfered portion 12 shorter than the sipe length L of the sipe 11 in each of a leading side edge 11A and a trailing side edge 11B of the sipe 11, and since there is a non-chamfered region 13 including no other chamfered portion in the part facing each chamfered portion 12 in the sipe 11, the drainage effect is improved based on the chamfered portion 12, and at the same time the non-chamfered region 13 is capable of effectively removing the water film by the edge effect. This thereby enables the steering stability performance on wet road surfaces to be significantly improved. Moreover, since the chamfered portion 12 and the non-chamfered region 13 including no chamfered portion are mixed in each of the leading side edge 11A and the trailing side edge 11B, the beneficial effect of improving the wet performance as described above may be maximized at the time of braking and at the time of accelerating. Further, since at least one of the chamfered portions 12, when viewed as a cross-section perpendicular to a longitudinal direction of the sipe 11, has a profile line OL that projects outwards in the tire radial direction beyond a chamfer reference line RL connecting both ends of the chamfered portion, and since a cross-sectional area a of a chamfered region Ra surrounded by the profile line OL, the sipe 11, and a tread contact surface of the tread portion 1 is smaller than a cross-sectional area b of a reference region Rb surrounded by the chamfer reference line RL, the sipe 11, and the tread contact surface, the block rigidity may be improved without reducing the ratio of the groove area on the tread pattern, thereby enabling the steering stability performance on dry road surfaces to be improved while maintaining the steering stability performance on wet road surfaces.

In the above-described pneumatic tire, it is preferable that the maximum depth x (mm) and the maximum depth y (mm) satisfy the relationship of the following formula (1). Providing the sipe 11 and the chamfered portion 12 so as to satisfy the relationship of the following formula (1) enables the area to be chamfered to be minimized compared with the sipe provided with the conventional chamfering, thereby enabling the steering stabilizing performance on dry road surfaces to be improved. As a result, improvement in the steering stability performance on dry road surfaces and improvement in the steering stability performance on wet road surfaces can be achieved in a compatible manner. Here, if $y<x\times0.1$, the drainage effect based on the chamfered portion 12 becomes insufficient, and conversely, if $y>x\times0.3+1.0$, the rigidity of the rib 10 deteriorates, lowering the steering stability performance on dry road surfaces. It is particularly preferable to satisfy the relation $y \leq x \times 0.3 + 0.5$.

$$x \times 0.1 \leq y \leq x \times 0.3 + 1.0 \quad (1)$$

In the above-described pneumatic tire, the cross-sectional area a of the chamfered region Ra is preferably in the range of from 30% to 95%, more preferably from 50% to 85% of the cross-sectional area b of the reference region Rb. Appropriately setting the cross-sectional area a of the chamfered region Ra with respect to the cross-sectional area b of the reference region Rb in this manner enables the steering stability performance on dry road surfaces to be improved while maintaining the steering stability performance on wet road surfaces.

Further, the volume Va of the chamfered region Ra is preferably in the range of from 30% to 95%, more preferably from 50% to 85% of the volume Vb of the reference region Rb. Appropriately setting the volume Va of the chamfered region Ra with respect to the volume Vb of the reference region Rb in this manner enables the steering stability performance on dry road surfaces to be improved while maintaining the steering stability performance on wet road surfaces.

As illustrated in FIG. 5B, the offset position P is the position where the chamfer reference line RL and the profile line OL of the chamfered portion 12 are most distant from each other. A distance from a width direction end of the sipe 11 on the tire surface to the offset position P is set as the offset distance A, and a distance, on the same straight line as the offset distance A, from the width direction end of the sipe 11 on the tire surface to the chamfer reference line RL is set as the reference distance B. In this case, the offset distance A of the chamfered portion 12 is preferably in the range of from 30% to 95%, more preferably from 60% to 90%, of the reference distance B. Appropriately setting the offset distance A of the chamfered portion 12 with respect to the reference distance B in this manner enables the steering stability performance on dry road surfaces to be improved while maintaining the steering stability performance on wet road surfaces.

At least one of the chamfered portions 12A and 12B positioned on the leading side and trailing side of the sipe 11 is opened to the main groove 9. In the chamfered portion 12 opened to the main groove 9, the offset distance A at the rib 10 center side end is smaller than the offset distance A at the main groove 9 side end. In particular, the offset distance A at the rib center side end is preferably from 0.5 to 0.9 times, and more preferably from 0.6 to 0.8 times, the offset distance A at the main groove 9 side end. Providing the chamfered portion 12 in this manner enables, since the drainage property is not hindered, the steering stability performance on dry road surfaces to be improved without deteriorating the steering stability performance on wet road surfaces.

In addition, in the chamfered portion 12 opened to the main groove 9, a cross-sectional area a of the chamfered region Ra at the rib center side end is smaller than a cross-sectional area a of the chamfered region Ra at the main groove 9 side end. In particular, the cross-sectional area a of the chamfered region Ra at the rib center side end is preferably from 0.5 to 0.9 times, and more preferably from 0.6 to 0.8 times, the cross-sectional area a of the chamfered region Ra at the main groove 9 side end. Providing the chamfered portion 12 in this manner enables, since the drainage property is not hindered, the steering stability performance on dry road surfaces to be improved without deteriorating the steering stability performance on wet road surfaces.

Figure 6:
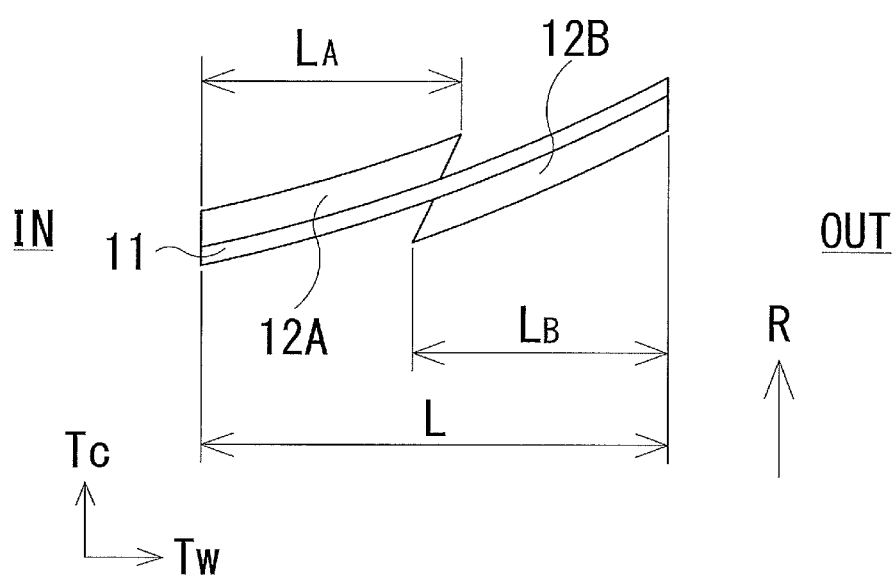
FIG. 6 is a plan view illustrating a modified example of a sipe and a chamfered portion thereof formed in a tread portion of a pneumatic tire according to the present technology.

FIG. 6 illustrates another modification of the sipe 11 and the chamfered portion 12 thereof formed in the tread portion 1 of the pneumatic tire according to the present technology. In FIG. 6, a mounting direction of the pneumatic tire with respect to a vehicle is designated, the pneumatic tire has a tread pattern asymmetric with respect to two sides of a tire center line, and IN denotes the vehicle inner side and OUT denotes the vehicle outer side.

In the above-described pneumatic tire, in the same rib 10, the offset distance A of the chamfered portion 12 positioned on the vehicle outer side is smaller than the offset distance A of the chamfered portion 12 positioned on the vehicle inner side. In particular, the offset distance A of the chamfered portion 12 positioned on the vehicle outer side is preferably from 0.5 to 0.9 times, and more preferably from 0.6 to 0.8 times, the offset distance A of the chamfered portion 12 positioned on the vehicle inner side. Providing the chamfered portion 12 in this manner enables the steering stability performance to be improved effectively on dry road surfaces while maintaining the steering stability performance on wet road surfaces.

Further, in the above-described pneumatic tire, in the same rib 10, the cross-sectional area a of the chamfered region Ra at the chamfered portion 12 positioned on the vehicle outer side is smaller than the cross-sectional area a of the chamfered region Ra at the chamfered portion 12 positioned on the vehicle inner side. In particular, the cross-sectional area a of the chamfered region Ra at the chamfered portion 12 positioned on the vehicle outer side is preferably configured to be from 0.5 to 0.9 times, and more preferably from 0.6 to 0.8 times, the cross-sectional area a of the chamfered region Ra at the chamfered portion 12 positioned on the vehicle inner side. Providing the chamfered portion 12 in this manner enables the steering stability performance to be improved on dry road surfaces while maintaining the steering stability performance on wet road surfaces.

In addition, in the above-described pneumatic tire, in the same rib 10, the volume Va of the chamfered region Ra at the chamfered portion 12 positioned on the vehicle outer side is smaller than the volume Va of the chamfered region Ra at the chamfered portion 12 positioned on the vehicle inner side. In particular, the volume Va of the chamfered region Ra at the chamfered portion 12 positioned on the vehicle outer side is preferably configured to be from 0.5 to 0.9 times, and more preferably from 0.6 to 0.8 times, the volume Va of the chamfered region Ra at the chamfered portion 12 positioned on the vehicle inner side. Providing the chamfered portion 12 in this manner enables the steering stability performance to be improved on dry road surfaces while maintaining the steering stability performance on wet road surfaces.

Figure 7:
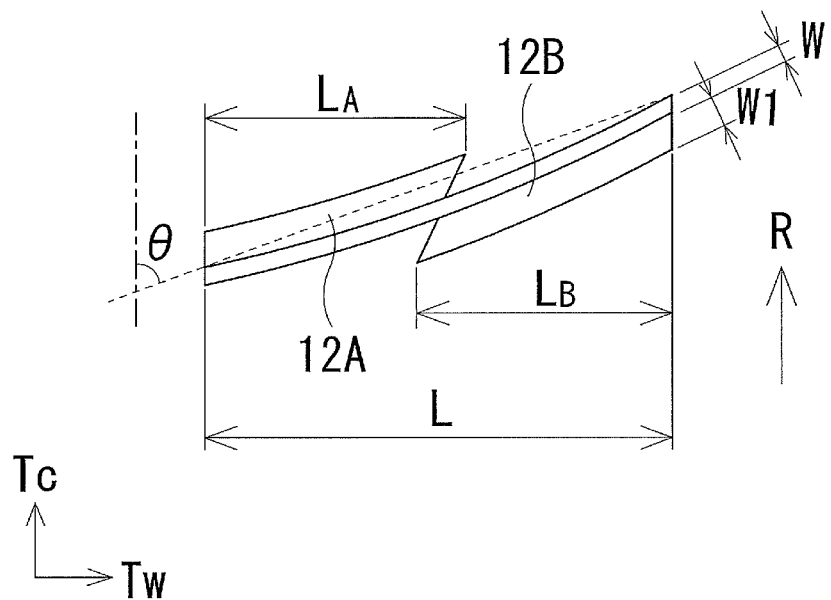
FIG. 7 is a plan view illustrating another modified example of a sipe and a chamfered portion thereof formed in a tread portion of a pneumatic tire according to the present technology.

FIG. 7 illustrates another modification of the sipe 11 and the chamfered portion 12 thereof formed in the tread portion 1 of the pneumatic tire according to the present technology. The sipe 11 illustrated in FIG. 7 is formed to have an inclination angle θ with respect to the tire circumferential direction. The inclination angle θ refers to an angle formed between a virtual line (a dotted line illustrated in FIG. 7) connecting both ends of the sipe 11 and a side surface of the block 101. There is an inclination angle on the acute angle side and an inclination angle on the obtuse angle side, and the inclination angle θ on the acute angle side is illustrated in FIG. 7. The inclination angle θ is targeted for the inclination angle of the sipe 11 with an intermediate pitch in the rib 10. In this case, the inclination angle θ on the acute angle side is preferably from 40° to 80°, and more preferably from 50° to 70°. By inclining the sipe 11 with respect to the circumferential direction of the tire in this manner, the pattern rigidity can be improved, and the steering stability performance on dry road surfaces can be further improved. Here, when the inclination angle θ is smaller than 40°, the uneven wear resistance deteriorates, and when it exceeds 80°, the pattern rigidity cannot be sufficiently improved.

In the present technology, the side having the inclination angle θ on the acute angle side of the sipe 11 is defined as the acute angle side, and the side having the inclination angle θ on the obtuse angle side of the sipe 11 is defined as the obtuse angle side. The chamfered portions 12A and 12B formed on the edges 11A and 11B of the sipe 11 are formed on the acute angle side of the sipe 11. Chamfering the acute angle side of the sipe 11 as described above enables the uneven wear resistance performance to be further improved. Alternatively, the chamfered portions 12A and 12B may be formed on the obtuse angle side of the sipe 11. Forming the chamfered portion 12 on the obtuse angle side of the sipe 11 as described above enables the edge effect to be increased and the steering stability performance on wet road surfaces to be further improved.

In the present technology, having the entire shape of the sipe 11 curved as described above enables the steering stability performance to be improved on wet road surfaces. Further, a part of the sipe 11 may be curved or bent in a plan view. Forming the sipe 11 in this manner increases the total amount of the edges 11A, 11B in each sipe 11, enabling the steering stability performance on wet road surfaces to be improved.

As illustrated in FIG. 7, one chamfered portion 12 is disposed on each of the edge 11A on the leading side and the edge 11B on the trailing side of the sipe 11. Having the chamfered portions 12 disposed in this manner enables the uneven wear resistance performance to be improved. Here, forming the chamfered portion 12 in two or more places on the edge 11A on the leading side and the edge 11B on the trailing side of the sipe 11 increases the number of nodes and tends to deteriorate the uneven wear resistance performance.

Here, the maximum value of the width of the chamfered portion 12 measured along the direction orthogonal to the sipe 11 is defined as a width W1. In this case, the maximum width W1 of the chamfered portion 12 is preferably from 0.8 to 5.0 times, and more preferably from 1.2 to 3.0 times, the sipe width W of the sipe 11. Setting the maximum width W1 of the chamfered portion 12 with respect to the sipe width W at an appropriate value in this manner enables the steering stability performance on dry road surfaces and the steering stability performance on wet road surfaces to be improved in a compatible manner. Here, when the maximum width W1 of the chamfered portion 12 is smaller than 0.8 times the sipe width W of the sipe 11, improvement in the steering stability performance on wet road surfaces is made insufficient, and if it is larger than 5.0 times, improvement in the steering stability performance on dry road surfaces is made insufficient.

Further, the outer edge portion in the longitudinal direction of the chamfered portion 12 is formed to be parallel to the extending direction of the sipe 11. Having the chamfered portion 12 extended in parallel with the sipe 11 in this manner enables the uneven wear resistance performance to be improved, and at the same time enables the steering stability performance on dry road surfaces and the steering stability performance on wet road surfaces to be improved in a compatible manner.

As illustrated in FIG. 7, ends of the chamfered portions 12A, 12B positioned closer to the main groove 9 do not communicate with the main grooves 9 located on both sides of the rib 10 but terminate in the rib 10. Forming the chamfered portion 12 in this manner enables the steering stability performance on dry road surfaces to be further improved. Alternatively, the ends of the chamfered portions 12A, 12B positioned closer to the main groove 9 may communicate with the main groove 9. Forming the chamfered portion 12 in this manner enables the steering stability performance on wet road surfaces to be further improved.

Figure 8A:
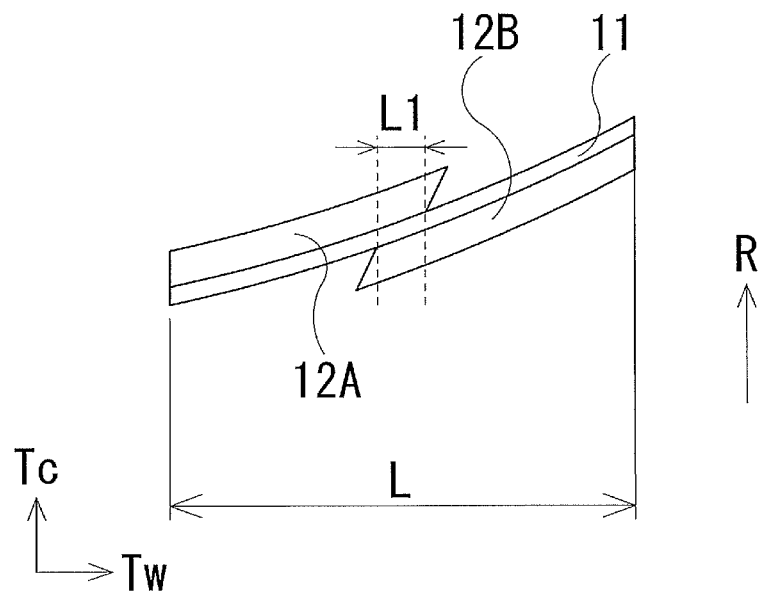
FIGS. 8A and 8B illustrate another modified example of a sipe and a chamfered portion thereof of a pneumatic tire according to the present technology.
Figure 8B:
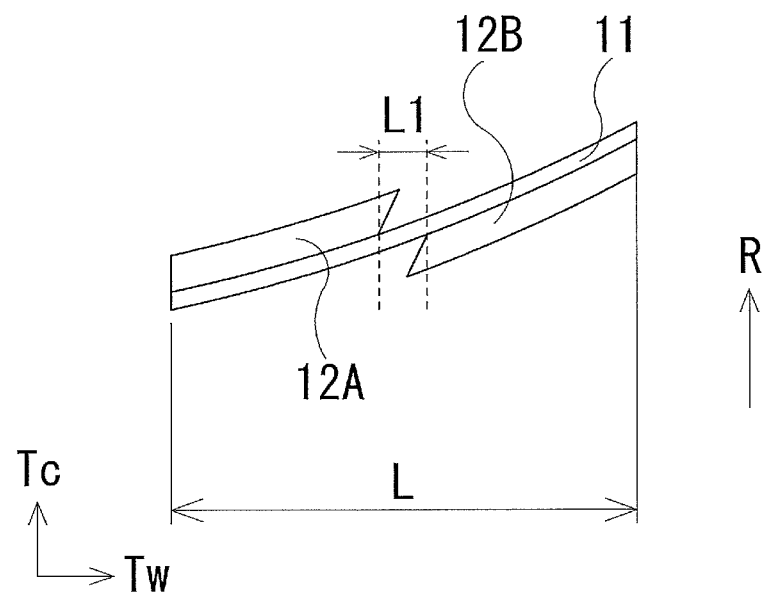

As illustrated in FIG. 8A, the chamfered portion 12A and the chamfered portion 12B are formed so that parts of both chamfered portions 12A, 12B overlap each other at the central portion of the sipe 11. Here, the length in the tire width direction of the overlap portion, which is a portion where the chamfered portion 12A and the chamfered portion 12B overlap, is set as an overlap length L1. On the other hand, as illustrated in FIG. 8B, in a case that parts of both chamfered portions 12A and chamfered portion 12B do not overlap and are spaced apart from each other at a certain interval, the ratio of the overlap length L1 to the sipe length L is expressed as a negative value. The overlap length L1 of the overlap portion is preferably from −30% to 30%, and more preferably from −15% to 15%, of the sipe length L. Appropriately configuring the overlap length L1 in the chamfered portion 12 with respect to the sipe length L in this manner enables the steering stability performance on dry road surfaces and the steering stability performance on wet road surfaces to be achieved in a compatible manner. Here, if the overlap length L1 is larger than 30%, improvement in the steering stability performance on dry road surfaces becomes insufficient, and if it is smaller than −30%, improvement in the steering stability performance on wet road surfaces becomes insufficient.

Figure 9:
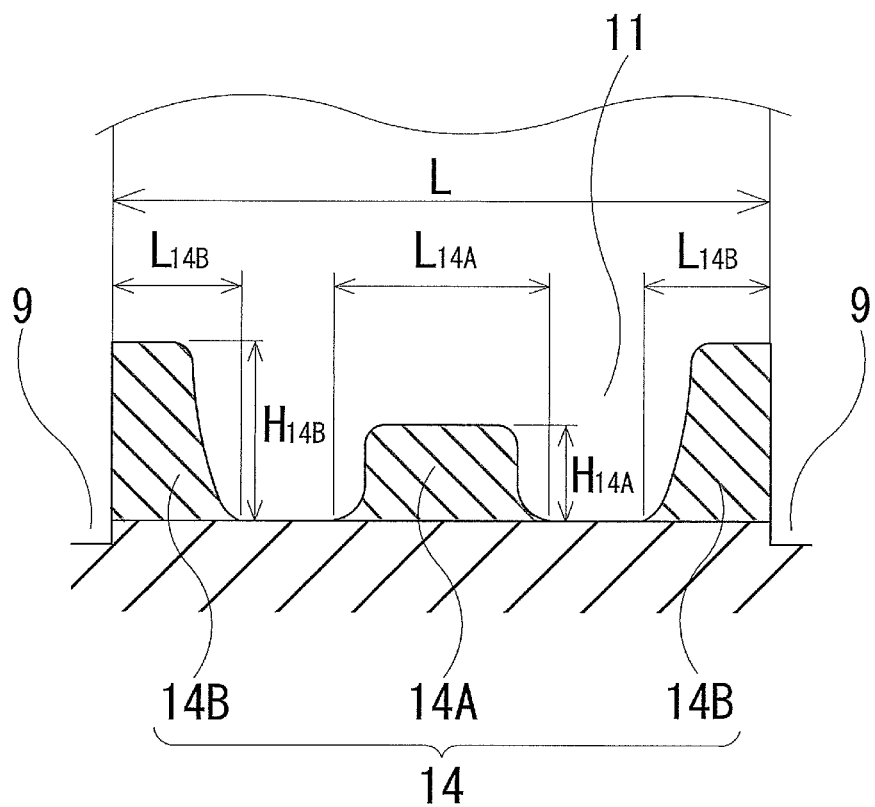
FIG. 9 is a cross-sectional view taken along the line Y-Y of FIG. 3.

As illustrated in FIG. 9, the sipe 11 includes a bottom raised portion 14 in a part of the longitudinal direction thereof. The bottom raising portion 14 includes a bottom raised portion 14A positioned at the central portion of the sipe 11, and a raised bottom portion 14B positioned at both ends of the sipe 11. Providing the bottom raised portion 14 in the sipe 11 in this manner enables improvement in the steering stability performance on dry road surfaces and improvement in the steering stability performance on wet road surfaces to be achieved in a compatible manner. The bottom raised portion 14 of the sipe 11 may be formed at an end portion and/or a non-end portion of the sipe 11.

The height of the bottom raised portion 14 in the tire radial direction formed in the sipe 11 is defined as a height $H_{14}$. The maximum value of the height from the groove bottom of the sipe 11 to the upper surface of the bottom raised portion 14A in the bottom raised portion 14A formed besides the end of the sipe 11 is set as the height $H_{14A}$. This height $H_{14A}$ is preferably from 0.2 to 0.5 times, and more preferably from 0.3 to 0.4 times, the maximum depth x of the sipe 11. Setting the height $H_{14A}$ of the bottom raised portion 14A disposed at a position other than the end of the sipe 11 at an appropriate height in this manner enables the rigidity of the block 101 to be improved and the drainage effect to be maintained, thereby improving the steering stability performance on wet road surfaces. Here, if the height $H_{14A}$ is smaller than 0.2 times the maximum depth x of the sipe 11, the rigidity of the block 101 cannot be sufficiently improved, and if it is larger than 0.5 times, the steering stability performance on wet road surfaces cannot be sufficiently improved.

In the bottom raised portion 14B formed at both ends of the sipe 11, the maximum value of the height from the groove bottom of the sipe 11 to the upper surface of the bottom raised portion 14B is set as the height $H_{14B}$. This height $H_{14B}$ is preferably from 0.6 to 0.9 times, and more preferably from 0.7 to 0.8 times, the maximum depth x of the sipe 11. Setting the height $H_{14B}$ of the bottom raised portion 14B formed at the end of the sipe 11 at an appropriate height in this manner enables the rigidity of the block 101 to be improved, enabling the steering stability performance on dry road surfaces to be improved. Here, if the height $H_{14B}$ is smaller than 0.6 times the maximum depth x of the sipe 11, the rigidity of the block 101 cannot be sufficiently improved, and if it is larger than 0.9 times, the steering stability performance on wet road surfaces cannot be sufficiently improved.

Further, the length in the tire width direction at the bottom raised portion 14 of the sipe 11 is set as the bottom raised length L14. The raised lengths $L_{14A}$ and $L_{14B}$ of the raised bottom portions 14A and 14B are preferably from 0.3 to 0.7 times, and more preferably from 0.4 to 0.6 times, the sipe length L. Appropriately setting the raised lengths $L_{14A}$ and $L_{14B}$ of the bottom raised portions 14A and 14B in this manner enables improvement in the steering stability performance on dry road surfaces and improvement in the steering stability performance on wet road surfaces to be achieved in a compatible manner.

EXAMPLES

In a pneumatic tire including a plurality of main grooves extending in the tire circumferential direction in a tread portion and including sipes extending in the tire width direction on a rib defined by the main grooves with a tire size of 245/40 R19, the following items were set as shown in Table 1, and the tires of Conventional Example 1, the Comparative Examples 1 and 2, and the Examples 1 to 5 were manufactured accordingly: chamfer arrangement (both sides or one side); relationship between sipe length L and chamfer lengths $L_A$, $L_B$; whether the part facing the chamfered portion is chamfered; sipe width; sipe maximum depth x (mm); chamfered portion maximum depth y (mm); ratio of offset distance A to reference distance B (A/B×100%); ratio of chamfered region cross-section area a to reference region cross-section area b (a/b×100%); and ratio of chamfered region volume Va to reference region volume Vb (Va/Vb× 100%).

In all of these test tires, the sipes formed in the ribs are open sipes whose both ends communicate with the main groove. In addition, the sipe width in Table 1 denotes whether the sipe width is constant within the range from the end located in the tire radial direction inward of the chamfered portion to the groove bottom of the sipe.

These test tires were tested by a test driver for a sensory evaluation of steering stability performance on dry road surfaces and steering stability performance on wet road surfaces, with the result indicated in Table 1.

Sensory evaluations on steering stability performance on dry road surfaces and steering stability performance on wet road surfaces were conducted by assembling each test tire to a rim size 19×8.5 J wheel and mounting it on a vehicle with air pressure of 260 kPa. Evaluation results are expressed as index values, with the results of Conventional Example 1 being assigned an index value of 100. Larger index values indicate superior steering stability performance on dry road surfaces and superior steering stability performance on wet road surfaces.

TABLE 1-1

|  | Conventional Example 1 | Comparative Example 1 | Comparative Example 2 |
|---|---|---|---|
| Chamfer arrangement (both sides or one side) | Both sides | One side | Both sides |
| Relationship between sipe length L and chamfer length $L_A$, $L_B$ | $L = L_A, L_B$ | $L = L_A$ | $L > L_A, L_B$ |
| Whether part facing chamfered portion is chamfered | Yes | No | No |
| Sipe width | Constant | With change | Constant |
| Sipe maximum depth x (mm) | 6 mm | 6 mm | 6 mm |
| Chamfered portion maximum depth y (mm) | 3 mm | 3 mm | 3 mm |
| Ratio of offset distance A to reference distance B (A/B × 100%) | 100 | 100 | 100 |
| Chamfered region cross-section area a to Reference region cross-section area b ratio (a/b × 100%) | 100 | 100 | 100 |
| Chamfered region volume Va to Reference region volume Vb ratio (Va/Vb × 100%) | 100 | 100 | 100 |
| Dry road surface steering stability performance | 100 | 90 | 103 |
| Wet road surface steering stability performance | 100 | 105 | 103 |

TABLE 1-2

|  | Example 1 | Example 2 | Example 3 | Example 4 | Example 5 |
|---|---|---|---|---|---|
| Chamfer arrangement (both sides or one side) | Both sides | Both sides | Both sides | Both sides | Both sides |
| Relationship between sipe length L and chamfer length $L_A$, $L_B$ | $L > L_A, L_B$ | $L > L_A, L_B$ | $L > L_A, L_B$ | $L > L_A, L_B$ | $L > L_A, L_B$ |
| Whether part facing chamfered portion is chamfered | No | No | No | No | No |
| Sipe width | Constant | Constant | Constant | Constant | Constant |
| Sipe maximum depth x (mm) | 6 mm | 6 mm | 6 mm | 6 mm | 6 mm |
| Chamfered portion maximum depth y (mm) | 3 mm | 3 mm | 3 mm | 3 mm | 2 mm |
| Ratio of offset distance A to reference distance B (A/B × 100%) | 97 | 93 | 91 | 87 | 87 |
| Chamfered region cross-section area a to Reference region cross-section area b ratio (a/b × 100%) | 95 | 92 | 89 | 87 | 87 |
| Chamfered region volume Va to Reference region volume Vb ratio (Va/Vb × 100%) | 95 | 92 | 92 | 89 | 89 |
| Dry road surface steering stability performance | 105 | 107 | 110 | 110 | 110 |
| Wet road surface steering stability performance | 103 | 103 | 103 | 103 | 105 |

As can be seen from Table 1, by devising the shape of the chamfered portion formed in the sipe, the steering stability performance on dry road surfaces and the steering stability performance on wet road surfaces were simultaneously improved in the tires of Examples 1 to 5 in comparison with Conventional Example 1.

On the other hand, in Comparative Example 1, since the chamfered portion was disposed only on one side and the sipe width was not constant, although the steering stability performance on wet road surfaces was improved, the effect of improving the steering stability performance on dry road surfaces was not sufficiently obtained. In Comparative Example 2, since the chamfered portion does not have a profile line that projects outwards in the tire radial direction beyond the chamfer reference line in a cross-sectional view perpendicular to the longitudinal direction of the sipe, improvement effect for the steering stability performance on dry road surfaces did not reach that of Example 1.

Next, similarly to Conventional Example 1, Comparative Examples 1 and 2, and Examples 1 to 5, in a pneumatic tire including a plurality of main grooves extending in the tire circumferential direction in a tread portion and including sipes extending in the tire width direction on a rib defined by the main grooves with a tire size of 245/40 R19, the tires of Conventional Example 2, Comparative Examples 3 and 4, and Examples 6 to 9 were manufactured, in which the ratio of offset distance A to reference distance B (A/B×100%), and the ratio of chamfered region cross-section area a to reference region cross-section area b (a/b×100%) are different between the rib center side and the main groove side. In the Conventional Example 2, Comparative Examples 3 and 4, and Examples 6 to 9, chamfer arrangement (both sides or one side), relationship between sipe length L and chamfer lengths $L_A$, $L_B$, whether the part facing the chamfered portion is chamfered, sipe width; sipe maximum depth x (mm), chamfered portion maximum depth y (mm), ratio of offset distance A to reference distance B (A/B×100%), and ratio of chamfered region cross-section area a to reference region cross-section area b (a/b×100%), were set as illustrated in Table 2.

These test tires were tested by a test driver for a sensory evaluation of the steering stability performance on dry road surfaces and the steering stability performance on wet road surfaces, with the result also indicated in Table 2.

TABLE 2-1

|  |  | Conventional Example 2 | Comparative Example 3 | Comparative Example 4 |
|---|---|---|---|---|
| Chamfer arrangement (both sides or one side) | | Both sides | One side | Both sides |
| Relationship between sipe length L and chamfer lengths $L_A$, $L_B$ | | $L = L_A, L_B$ | $L = L_A$ | $L > L_A, L_B$ |
| Whether chamfer in part facing chamfered portion is present | | Yes | No | No |
| Sipe width | | Constant | With change | Constant |
| Sipe maximum depth x (mm) | | 6 mm | 6 mm | 6 mm |
| Chamfered portion maximum depth y (mm) | | 3 mm | 3 mm | 3 mm |
| Ratio of offset distance A to reference distance B (A/B × 100%) | Rib center side | 100 | 100 | 100 |
| | Main groove side | 100 | 100 | 100 |
| Chamfered region cross-section area a to Reference region cross-section area b ratio (a/b × 100%) | Rib center side | 100 | 100 | 100 |
| | Main groove side | 100 | 100 | 100 |
| Dry road surface steering stability performance | | 100 | 90 | 103 |
| Wet road surface steering stability performance | | 100 | 105 | 103 |

TABLE 2-2

|  |  | Example 6 | Example 7 | Example 8 | Example 9 |
|---|---|---|---|---|---|
| Chamfer arrangement (both sides or one side) | | Both sides | Both sides | Both sides | Both sides |
| Relationship between sipe length L and chamfer lengths $L_A$, $L_B$ | | $L > L_A, L_B$ | $L > L_A, L_B$ | $L > L_A, L_B$ | $L > L_A, L_B$ |
| Whether chamfer in part facing chamfered portion is present | | No | No | No | No |
| Sipe width | | Constant | Constant | Constant | Constant |
| Sipe maximum depth x (mm) | | 6 mm | 6 mm | 6 mm | 6 mm |
| Chamfered portion maximum depth y (mm) | | 2 mm | 2 mm | 2 mm | 2 mm |
| Ratio of offset distance A to reference distance B (A/B × 100%) | Rib center side | 83 | 77 | 77 | 77 |
| | Main groove side | 100 | 100 | 100 | 100 |
| Chamfered region cross-section area a to Reference region cross-section area b ratio (a/b × 100%) | Rib center side | 87 | 87 | 83 | 77 |
| | Main groove side | 87 | 87 | 87 | 87 |
| Dry road surface steering stability performance | | 111 | 113 | 114 | 116 |
| Wet road surface steering stability performance | | 105 | 105 | 105 | 105 |

As can be seen from Table 2, by devising the shape of the chamfered portion formed in the sipe, the steering stability performance on dry road surfaces and the steering stability performance on wet road surfaces were simultaneously improved in the tires of Examples 6 to 9 in comparison with Conventional Example 2.

On the other hand, in Comparative Example 3, since the chamfered portion was disposed only on one side and the sipe width was not constant, although the steering stability performance on wet road surfaces was improved, the effect of improving the steering stability performance on dry road surfaces was not obtained sufficiently. In Comparative Example 4, since the chamfered portion does not have a profile line that projects outwards in the tire radial direction beyond the chamfer reference line in a cross-sectional view perpendicular to the longitudinal direction of the sipe, improvement effect for the steering stability performance on dry road surfaces did not reach that of Example 6.

Further, similarly to Conventional Example 1, Comparative Examples 1 and 2, and Examples 1 to 5, in a pneumatic tire including a plurality of main grooves extending in the tire circumferential direction in a tread portion and including sipes extending in the tire width direction on a rib defined by the main grooves with a tire size of 245/40 R19, the tires of Conventional Example 3, Comparative Examples 5 and 6, and Examples 10 to 16 were manufactured, in which the ratio of offset distance A to reference distance B (A/B×100%), the ratio of chamfered region cross-section area a to reference region cross-section area b (a/b×100%), and the ratio of chamfered region volume Va to reference region volume Vb (Va/Vb×100%) are different between the vehicle inner side and the vehicle outer side. In the Conventional Example 3, Comparative Examples 5 and 6, and Examples 10 to 16, chamfering arrangement (both sides or one side), relationship between the sipe length L and the lengths of the chamfer lengths $L_A$, $L_B$, whether the part facing the chamfered portion is chamfered, sipe width, sipe maximum depth x (mm), chamfered portion maximum depth y (mm), ratio of offset distance A to reference distance B (A/B×100%), ratio of chamfered region cross-section area a to reference region cross-section area b (a/b×100%), ratio of chamfered region volume Va to reference region volume Vb (Va/Vb×100%), and whether the bottom raised portion is present, were set as shown in Table 3.

These test tires were tested by a test driver for a sensory evaluation of steering stability performance on dry road surfaces and steering stability performance on wet road surfaces, with the result also indicated in Table 3.

TABLE 3-1

|  |  | Conventional Example 3 | Comparative Example 5 | Comparative Example 6 | Example 10 |
|---|---|---|---|---|---|
| Chamfer arrangement (both sides or one side) |  | Both sides | One side | Both sides | Both sides |
| Relationship between sipe length L and chamfer length $L_A$, $L_B$ |  | L = $L_A$, $L_B$ | L = $L_A$ | L > $L_A$, $L_B$ | L > $L_A$, $L_B$ |
| Whether the part facing chamfered portion is chamfered |  | Yes | No | No | No |
| Sipe width |  | Constant | With change | Constant | Constant |
| Sipe maximum depth x (mm) |  | 6 mm | 6 mm | 6 mm | 6 mm |
| Chamfered portion maximum depth y (mm) |  | 3 mm | 3 mm | 3 mm | 2 mm |
| Ratio of offset distance A to reference distance B (A/B × 100%) | Vehicle inner side | 100 | 100 | 100 | 87 |
|  | Vehicle outer side | 100 | 100 | 100 | 85 |
| Chamfered region cross-section area a to Reference region cross-section area b ratio (a/b × 100%) | Vehicle inner side | 100 | 100 | 100 | 87 |
|  | Vehicle outer side | 100 | 100 | 100 | 87 |
| Chamfered region volume Va to Reference region volume Vb ratio (Va/Vb × 100%) | Vehicle inner side | 100 | 100 | 100 | 87 |
|  | Vehicle outer side | 100 | 100 | 100 | 87 |
| Whether bottom raised portion is present |  | No | No | No | No |
| Dry road surface steering stability performance |  | 100 | 90 | 103 | 111 |
| Wet road surface steering stability performance |  | 100 | 105 | 103 | 105 |

TABLE 3-2

|  | Example 11 | Example 12 | Example 13 | Example 14 | Example 15 | Example 16 |
|---|---|---|---|---|---|---|
| Chamfer arrangement (both sides or one side) | Both sides | Both sides | Both sides | Both sides | Both sides | Both sides |
| Relationship between sipe length L and chamfer length $L_A$, $L_B$ | L > $L_A$, $L_B$ | L > $L_A$, $L_B$ | L > $L_A$, $L_B$ | L > $L_A$, $L_B$ | L > $L_A$, $L_B$ | L > $L_A$, $L_B$ |
| Whether the part facing chamfered portion is chamfered | No | No | No | No | No | No |
| Sipe width | Constant | Constant | Constant | Constant | Constant | Constant |
| Sipe maximum depth x (mm) | 6 mm | 6 mm | 6 mm | 6 mm | 6 mm | 6 mm |
| Chamfered portion maximum depth y (mm) | 2 mm | 2 mm | 2 mm | 2 mm | 2 mm | 2 mm |

TABLE 3-2-continued

|  |  | Example 11 | Example 12 | Example 13 | Example 14 | Example 15 | Example 16 |
|---|---|---|---|---|---|---|---|
| Ratio of offset distance A to reference distance B (A/B × 100%) | Vehicle inner side | 87 | 87 | 87 | 87 | 87 | 87 |
|  | Vehicle outer side | 77 | 77 | 77 | 77 | 77 | 77 |
| Chamfered region cross-section area a to Reference region cross-section area b ratio (a/b × 100%) | Vehicle inner side | 87 | 87 | 87 | 87 | 87 | 87 |
|  | Vehicle outer side | 87 | 85 | 77 | 77 | 77 | 77 |
| Chamfered region volume Va to Reference region volume Vb ratio (Va/Vb × 100%) | Vehicle inner side | 87 | 87 | 87 | 87 | 87 | 87 |
|  | Vehicle outer side | 87 | 87 | 87 | 85 | 77 | 77 |
| Whether bottom raised portion is present |  | No | No | No | No | No | Yes |
| Dry road surface steering stability performance |  | 113 | 114 | 116 | 117 | 118 | 118 |
| Wet road surface steering stability performance |  | 105 | 105 | 105 | 105 | 105 | 107 |

As can be seen from Table 3, by devising the shape of the chamfered portion formed in the sipe, the steering stability performance on dry road surfaces and the steering stability performance on wet road surfaces were simultaneously improved in the tires of Examples 10 to 16 in comparison with Conventional Example 3.

On the other hand, in Comparative Example 5, since the chamfered portion was disposed only on one side and the sipe width was not constant, although the steering stability performance on wet road surface was improved, the effect of improving the steering stability performance on dry road surfaces was not obtained sufficiently. In Comparative Example 6, since the chamfered portion does not have a profile line that projects outwards in the tire radial direction beyond the chamfer reference line in a cross-sectional view perpendicular to the longitudinal direction of the sipe, improvement effect for the steering stability performance on dry road surfaces did not reach that of Example 10.

The invention claimed is:

1. A pneumatic tire comprising: a plurality of main grooves extending in a tire circumferential direction in a tread portion; and a sipe extending in a tire width direction in a rib defined by the plurality of main grooves,
the sipe comprising a leading side edge and a trailing side edge, a chamfered portion shorter than a sipe length of the sipe being formed in each of the leading side edge and the trailing side edge, a non-chamfered region comprising no other chamfered portion being present in a part facing each chamfered portion of the sipe, a maximum depth y (mm) of the chamfered portion being shallower than a maximum depth x (mm) of the sipe, a sipe width of the sipe being constant in a range from an end positioned inward of the chamfered portion in a tire radial direction to a groove bottom of the sipe, at least one of the chamfered portions when viewed as a cross-section perpendicular to a longitudinal direction of the sipe comprising a profile line that projects outwards in the tire radial direction beyond a chamfer reference line connecting both ends of the chamfered portion and that is composed of a single arc, and a cross-sectional area a of a chamfered region surrounded by the profile line, the sipe, and a tread contact surface of the tread portion being smaller than a cross-sectional area b of a reference region surrounded by the chamfer reference line, the sipe, and the tread contact surface;
wherein each of the chamfered portions have a sipe edge extending along a length direction of the sipe where the chamfered portion meets the sipe and an opposite edge opposite the sipe edge, where a tire width direction component of a length of the sipe edge in the tire width direction is shorter than a tire width direction component of a length of the opposite edge in the tire width direction.

2. The pneumatic tire according to claim 1, wherein the cross-sectional area a of the chamfered region is in a range of from 30% to 95% of the cross-sectional area b of the reference region.

3. The pneumatic tire according to claim 1, wherein a volume Va of the chamfered region is in a range of from 30% to 95% of a volume Vb of the reference region.

4. The pneumatic tire according to claim 1, wherein, when a position at which the chamfer reference line and the profile line of the chamfered portion are farthest apart is set as an offset position, an offset distance A which is a distance from a width direction end of the sipe on a tire surface to the offset position is in a range of from 30% to 95% of a reference distance B, which is on a same straight line as the offset distance A and which is a distance from a width direction end of the sipe on the tire surface to the chamfer reference line.

5. The pneumatic tire according to claim 1, wherein the maximum depth x (mm) of the sipe and the maximum depth y (mm) of the chamfered portion satisfy a relationship of a following formula (1):

$$x \times 0.1 \leq y \leq x \times 0.3 + 1.0 \tag{1}$$

6. The pneumatic tire according to claim 1, wherein, when a distance from a width direction end of the sipe on a tire surface to an offset position, which is a position at which the chamfer reference line and the profile line of the chamfered portion are most distant from each other, is set as an offset distance A, at least one side of the chamfered portions is opened to the main groove, and in the chamfered portion opened to one of the main grooves, the offset distance A at a rib center side end is smaller than the offset distance A at a main groove side end.

7. The pneumatic tire according to claim 6, wherein, in the chamfered portion opened to the one of the main grooves, the offset distance A at the rib center side end is from 0.5 to 0.9 times the offset distance A at the main groove side end.

8. The pneumatic tire according to claim 1, wherein, at least one side of the chamfered portions is opened to one of the main grooves, and, in the chamfered portion opened to the one of the main grooves, a cross-sectional area a of the chamfered region at a rib center side end is smaller than a cross-sectional area a of the chamfered region at a main groove side end.

9. The pneumatic tire according to claim 8, wherein, in the chamfered portion opened to the one of the main grooves, the cross-sectional area a of the chamfered region at the rib center side end is from 0.5 to 0.9 times the cross-sectional area a of the chamfered region at the main groove side end.

10. The pneumatic tire according to claim 1, wherein, the pneumatic tire has a designated mounting direction with respect to a vehicle and a tread pattern asymmetric with respect to two sides of a tire center line, and when a distance from a width direction end of the sipe on a tire surface to an offset position, which is a position at which the chamfer reference line and the profile line of the chamfered portion are most distant from each other, is set as an offset distance A, in the rib, the offset distance A of the chamfered portion located on a vehicle outer side is smaller than the offset distance A of the chamfered portion located on a vehicle inner side.

11. The pneumatic tire according to claim 10, wherein, the offset distance A of the chamfered portion located on the vehicle outer side is from 0.5 to 0.9 times the offset distance A of the chamfered portion located on the vehicle inner side.

12. The pneumatic tire according to claim 1, wherein, the pneumatic tire has a designated mounting direction with respect to a vehicle and a tread pattern asymmetric with respect to two sides of a tire center line, and in the rib, a cross-sectional area a of the chamfered region at the chamfered portion located on a vehicle outer side is smaller than a cross-sectional area a of the chamfered region at the chamfered portion located on a vehicle inner side.

13. The pneumatic tire according to claim 12, wherein, the cross-sectional area a of the chamfered region at the chamfered portion located on the vehicle outer side is from 0.5 to 0.9 times the cross-sectional area a of the chamfered region at the chamfered portion located on the vehicle inner side.

14. The pneumatic tire according to claim 1, wherein, the pneumatic tire has a designated mounting direction with respect to a vehicle and a tread pattern asymmetric with respect to two sides of a tire center line, and in the rib, a volume Va of the chamfered region at the chamfered portion located on a vehicle outer side is smaller than a volume Va of the chamfered region at the chamfered portion located on a vehicle inner side.

15. The pneumatic tire according to claim 14, wherein, the volume Va of the chamfered region at the chamfered portion located on the vehicle outer side is from 0.5 to 0.9 times the volume Va of the chamfered region at the chamfered portion located on the vehicle inner side.

* * * * *